Patented May 14, 1940

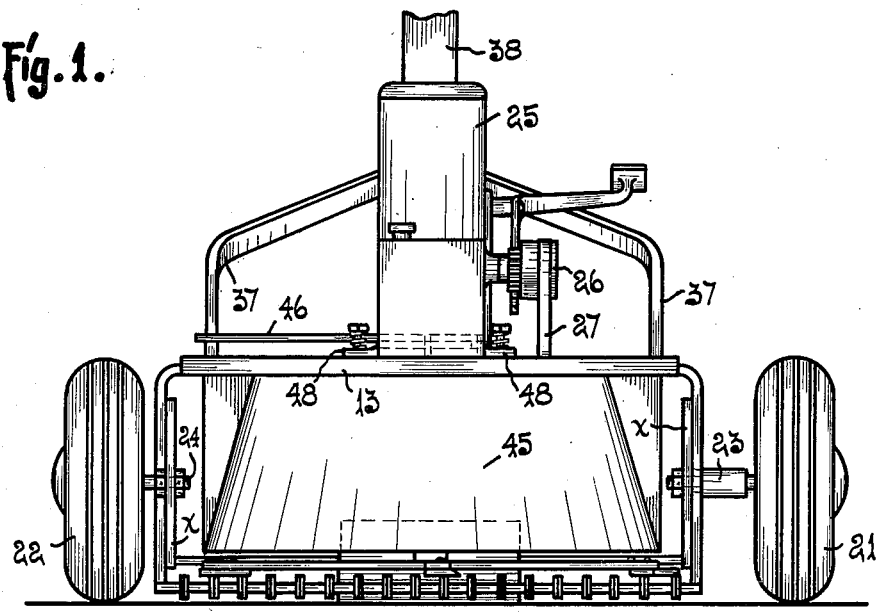
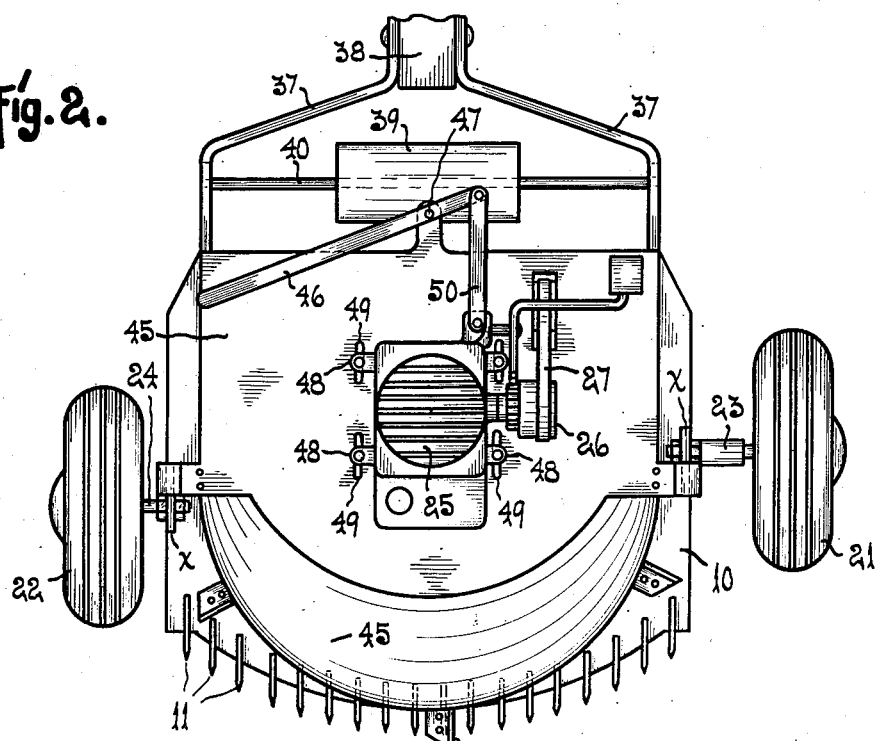

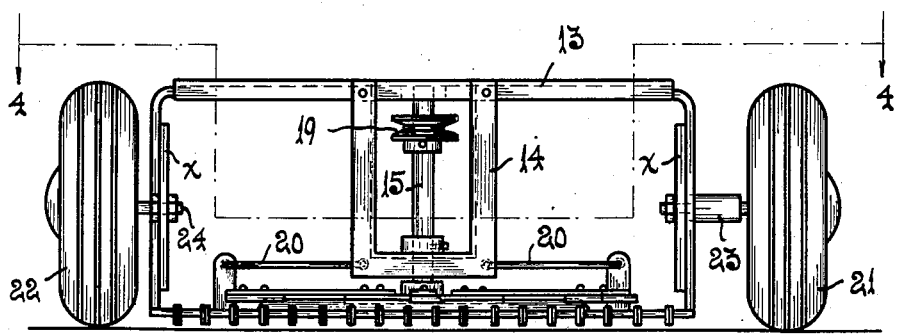
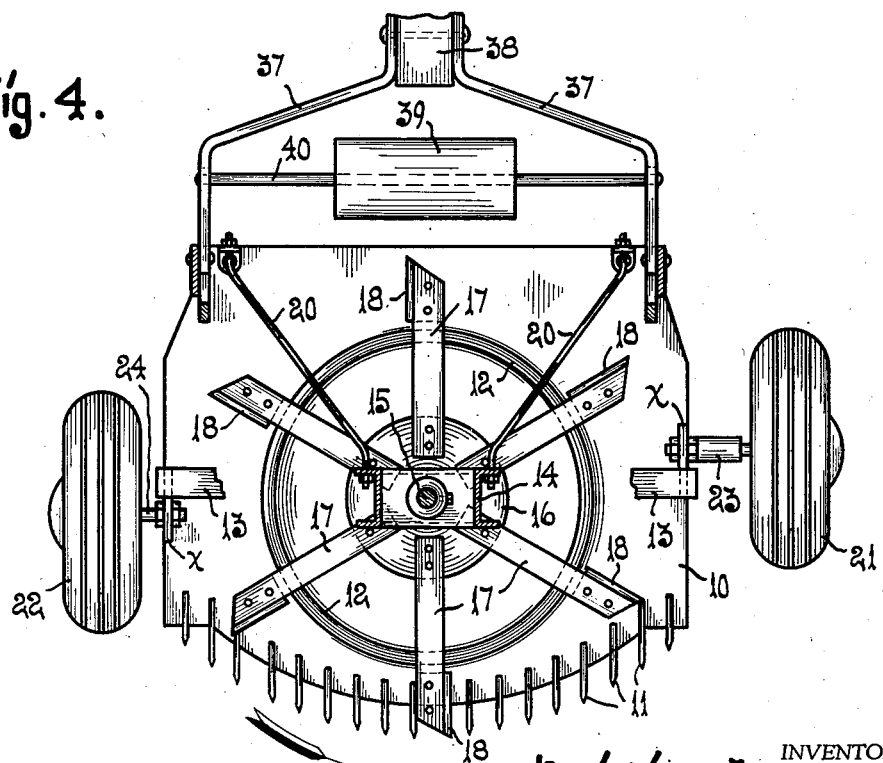

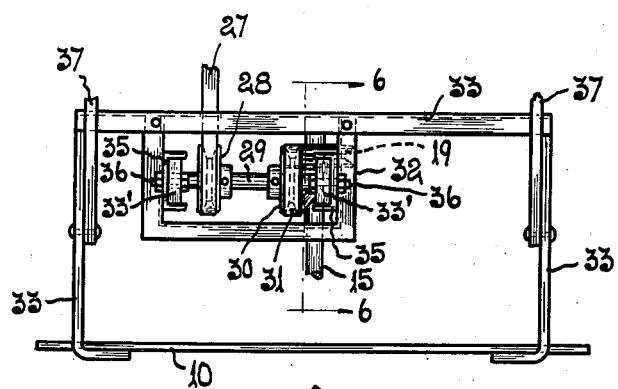
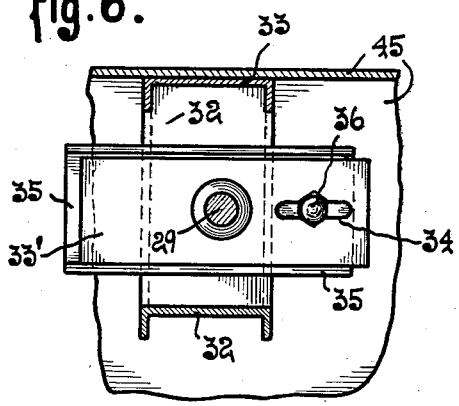
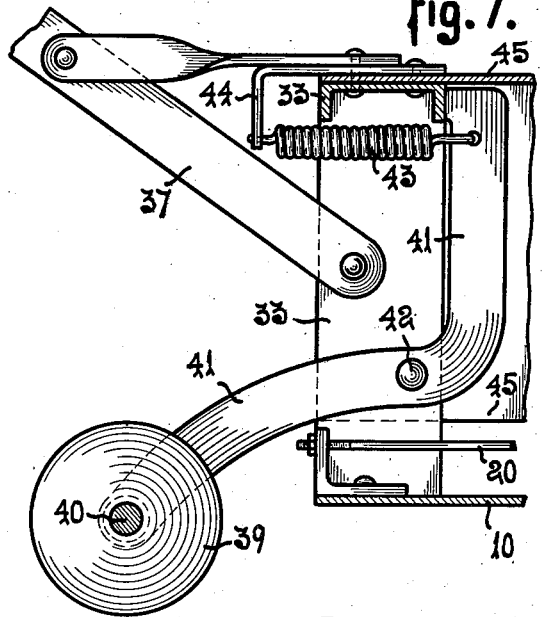
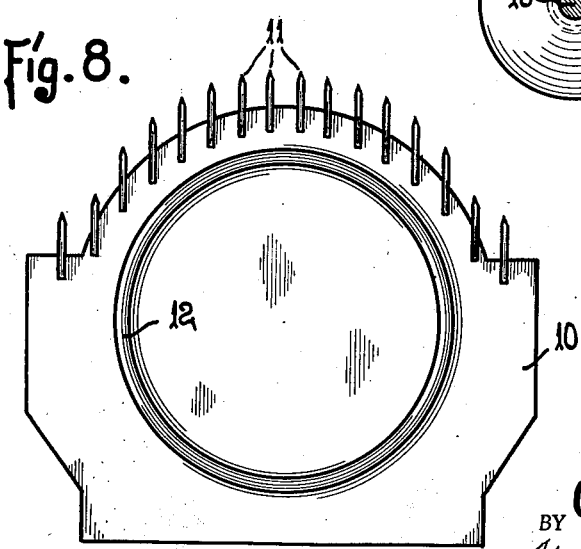

2,200,368

UNITED STATES PATENT OFFICE 2,200,368

LAWN MOWER

Christian Iverson, Weston, Iowa

Application August 5, 1939, Serial No. 288,605

8 Claims. (Cl. 56—25.4)

This invention relates to an improvement in lawn mowers, and specifically, to an improvement of the invention described in United States patent application, Ser. No. 231,198, filed by this applicant, and now pending.

The invention relates to that class of mowers adapted to cut tall grass and weeds at the front of the mower-body, and the objects now in view relate, in part, to such a construction that a lesser power will be required for traction, and that the cut grass and weeds thrown transversely of the line of travel will not become clogged between the "near" ground wheel and body of the mower; also to provide such a mounting for the vertical rotatable shaft of the horizontal cutter-disc that these parts will not be connected with the base-plate.

Since the base-plate, during operation, is exposed and is subjected to shocks and vibration, the rotatable shaft of the cutter-disc should be free from any connection with the base-plate as now provided.

Also, since the present invention is for use in connection with specific power-means, belt-driven pulleys and shafts, and a specific ground-engaging roller found to be of great advantage in operation, these features will be described in detail.

The invention consists of the new and useful construction, combination and arrangement of parts as described herein and claimed, and as illustrated in the accompanying drawings, it being understood that changes may be made in form, size, proportions and minor details of construction, said changes being within the scope of the invention as claimed.

In the drawings, Fig. 1 is a view of the lawn mower in front elevation, and Fig. 2 is a plan view of the same.

Fig. 3 is a front view of the mower-frame, the hood, motor, and the motor shafts and pulley-belts being removed, and Fig. 4 is a plan view of the same, in section, on line 4—4 of Fig. 3.

Fig. 5 is a rear view showing a part of the mower-frame to disclose a horizontal shaft driven by the motor; and Fig. 6 is an enlarged detail, being a vertical section on line 6—6 of Fig. 5, and showing means for adjusting a horizontal shaft, driven by the motor.

Fig. 7 is a view in vertical section showing resilient means, so that the roller and its pressure on the ground may be under effective control of an operator.

Fig. 8 is a plan view of the imperforate base-plate, and Fig. 9 is a plan view, being a detail relating to Figs. 3 and 5, showing an endless belt mounted on a vertical pulley and engaging a horizontal pulley.

Referring now to the drawings for a more particular description, I provide an imperforate horizontal base-plate 10 provided with forwardly projecting teeth 11 and also provided, on its upper side, with a buffer element or ridge 12 having a curvature corresponding approximately to the curved front edge of the base-plate, said ridge having a part disposed adjacent to the teeth.

Numeral 13 indicates a vertical, arcuate yoke projecting above the base-plate 10, the arms of the yoke being secured to the opposed edges of said plate.

Numeral 14 indicates a U-shaped hanger which is secured to the arcuate yoke, midway between the arms of said yoke, and at 15 is indicated a vertical operating shaft which is journalled at its ends in the yoke and hanger, the lower end of said shaft being secured to a cutter-disc 16, centrally thereof. This horizontal cutter-disc is provided with radially disposed arms 17 with terminal blades 18.

Since the rotatable shaft 15 is provided with a pulley 19 for a connection with certain power-mechanism to be described, it is obvious that any swinging movements of the hanger, relative to the yoke 13, should be prevented, and therefore I provide a pair of stay-rods 20, one end of each stay-rod being secured to the mower-frame and the other end being secured to the hanger.

It will be noted that the ground-wheels are disposed in non-alignment with the transverse axis of the mower body, the "near" wheel 21 being disposed rearwardly of the yoke 13 and the ground-wheel 22 being disposed forwardly of said yoke.

It will be noted that the spindle 23 of the "near" ground-wheel 21 is of greater length than the length of the spindle 24 of the "off" wheel 22, and therefore tall grass and weeds will not become wedged, during operation, between the wheel 21 and body of the mower, the cutter-disc moving in the direction indicated by the arrow shown in Fig. 4. At $x$ are indicated brackets which are secured to the arms of the yoke 13 in which the spindles of the ground-wheels are mounted.

As thus described, these wheels are disposed at unequal distances from the longitudinal axis of the mower body and at unequal distances from the sides of the mower, and are disposed in non-alignment with the transverse axis of said mower.

In operation, the cutter-disc will rotate freely beneath the stay-rods 20, between the hanger 14 and base-plate 10, the curved ridge 12 normally tending to maintain the cutter-disc 16 in a parallel position relative to the base-plate, and rocking movements of the cutter-disc being prevented.

While the shaft 15 could be driven by any suitable power, I have shown and prefer the use of a gasoline motor 25 for this purpose, the horizontal shaft of the motor being provided with a pulley 26 engaged by a belt 27.

As best shown in Fig. 5, the belt 27 also engages a pulley 28 which is mounted on a horizontal shaft 29, this shaft 29 being provided with a second pulley 30, and a pulley-belt 31 thereon is used for engaging the pulley 19 of shaft 15.

Since the grooves for these pulleys are of V-shape in cross-section, the belts are of triangular form in cross-section, the advantage being that a greater surface is provided which tends to prevent the belts from creeping or slipping in the grooves of the pulleys.

The horizontal shaft 29 is mounted in a rectangular frame 32, said frame being secured to a yoke 33 of inverted U-shape best shown in Fig. 5, the arms of this yoke being mounted on the rear end of the base-plate 10.

In order that the belts 27 and 31 may be adjusted to fit snugly upon their pulleys, the ends of this shaft 29 are journalled in plates 33' (Fig. 6), each of these plates being provided with a slot 34. Each plate 33' is slidably mounted in a housing-plate 35, and by means of a keeper 36 which is carried by the housing-plate 35, the slide-plates 33' may be adjusted longitudinally when adjusting the shaft 29 for the purpose mentioned.

The arms 37 of the handle 38 are mounted on the arms of the yoke 33. The roller 39 is rotatably mounted on a shaft 40, this shaft being mounted at its ends in a pair of rock-arms 41, and as arranged, the roller is resiliently mounted, each arm being pivotally mounted as indicated at 42, between its ends upon an arm of the yoke 33, the opposite end of each arm 41 being attached to one end of a spiral spring 43, the opposite end of each spring being secured to a bracket 44 which is secured to the yoke 33.

As thus described, the springs 43 normally maintain the upper ends of the rock-arms in contact with the yoke 33, and a downward pressure and downward swinging movement of the handle 38 will cause a pressure of the roller upon the ground and a resulting swinging movement of the mower relative to the ground-wheels, this control being of great advantage when operating on rough ground.

When "starting" the gasoline motor, it is an advantage to loosen the belt 27 from the motor-pulley 26. The front and top and sides of the mower-body are covered with a hood 45. The gasoline motor is slidingly mounted on the top of the hood, and by use of a hand-lever 46 which is pivotally mounted between its ends as indicated at 47, the motor may be moved rearwardly for loosening the belt 27, the motor being provided with anchor-members 48 adapted to slide in slots 49 of the hood, the lever 46 being pivotally attached to a link 50 which is secured to the motor.

I claim as my invention:

1. In a lawn mower, a mower frame including a horizontal base-plate having forwardly projecting teeth, a yoke of arcuate form disposed above and having parts secured to the base-plate, a hanger-frame below and secured to the yoke, a pair of ground wheels disposed in non-alignment with the transverse axis of the mower frame and journalled on the yoke, a rotatable, normally vertical operating shaft journalled in the yoke and hanger-frame, and a normally horizontal cutter-disc between the base-plate and hanger-frame carried by the operating shaft.

2. In a lawn mower, a mower frame including a horizontal base-plate having forwardly projecting teeth, a yoke of arcuate form above and having parts secured to the base-plate, a hanger-frame mounted dependingly on the yoke and projecting toward the base-plate, a pair of rearwardly projecting stay-rods carried by the mower frame and secured to the hanger-frame, a pair of ground wheels disposed in non-alignment with the transverse axis of the mower frame and journalled on the yoke, a rotatable, vertical operating shaft journalled in the yoke and hanger-frame, and a normally horizontal cutter-disc below the stay-rods intermediate the base-plate and hanger-frame and carried by the operating shaft.

3. In a lawn mower, a mower frame including a horizontal base-plate having a semicircular end-portion provided with forwardly projecting teeth and a buffer-ridge adjacent and approximately concentric with said semicircular end-portion, an arcuate yoke on the base-plate, a hanger-frame on the yoke projecting toward the base-plate, a pair of ground wheels disposed at the sides in non-alignment with the transverse axis of the mower frame and journalled on the yoke, a rotatable shaft journalled on the yoke and hanger-frame, and a normally horizontal cutter-disc above and closely adjacent the teeth and buffer-ridge of the base-plate and carried by said rotatable shaft.

4. In a lawn mower, a mower frame comprising a base-plate having a semicircular terminal provided with forwardly projecting teeth, an arcuate yoke disposed above and transversely of the base-plate with parts secured to said plate, a hanger-frame secured to the yoke, a rotatable, normally vertical operating shaft disposed in a plane coincident with the transverse and longitudinal axes and above the base-plate and journalled in the yoke and said hanger-frame, a cutter-disc carried by the operating shaft and disposed between the base-plate and hanger-frame, and a pair of journalled ground wheels disposed at the respective sides in non-alignment with the transverse axis and at unequal distances from said mower frame.

5. In a lawn mower, a mower frame including a base-plate, an arcuate yoke disposed transversely above and secured to the base-plate and defining the sides of the mower-frame, a U-shaped hanger projecting toward the base-plate and secured to the yoke, a rotatable, normally vertical shaft disposed in a plane coincident with the transverse and longitudinal axes of the base-plate and journalled in the yoke and hanger, a cutter-disc carried by the shaft and disposed between the hanger and base-plate, and a pair of ground wheels journalled in bearings at opposed sides of the mower-frame, said bearings being in non-alignment with the transverse axis of said mower-frame.

6. In a lawn mower, a mower frame including a horizontal base-plate provided with forwardly projecting teeth, an arcuate yoke disposed transversely and mounted on the base-plate, a hanger-frame depending from the yoke midway between the sides of the mower-frame, a pair of stay-rods carried by the hanger-frame and secured to said mower-frame, a rotatable shaft journalled in the yoke and hanger-frame, a cutter-disc disposed between the stay-rods and base-plate below the hanger-frame and carried by said shaft, and a pair of journalled ground wheels disposed in nonalignment with the transverse axis and at unequal distances from the sides of said mower-frame.

7. In a lawn mower, a mower-frame comprising a base-plate having a curved end-portion provided with forwardly projecting teeth, an arcuate yoke upon and secured to the base-plate, a hanger-frame extending toward the base-plate and mounted on the yoke, a rotatable shaft journalled in the yoke and hanger-frame, a cutter-disc carried by the rotatable shaft and disposed between the hanger-frame and said base-plate, and a pair of ground wheels in journalled bearings at the sides of the mower-frame, the bearings of one ground wheel being disposed forwardly and the bearings of the other ground wheel being disposed rearwardly of the transverse axis of said mower-frame.

8. In a lawn mower, a mower frame including a base-plate having a curved end-portion provided with forwardly projecting teeth and a ridge approximately concentric with the curvature of said end-portion, an arcuate yoke above and secured to the base-plate, a hanger-element extending toward the base-plate and mounted on the yoke, a rotatable shaft journalled in the yoke and hanger-element, a cutter-disc carried by the shaft and disposed between the base-plate and hanger-element closely adjacent said ridge, and a pair of ground wheels at the sides of the mower-frame having journalled bearings on the yoke, one of said ground wheels being disposed forwardly and the other ground wheel of said pair being disposed rearwardly of the transverse axis of the mower-frame at unequal lateral distances from said frame.

CHRISTIAN IVERSON.